United States Patent [19]

van der Mark

[11] 4,039,486

[45] Aug. 2, 1977

[54] FOAMABLE VINYL-CHLORIDE POLYMERS AND RIGID FOAM STRUCTURES MADE THEREOF

[75] Inventor: Johannes M.A.A. van der Mark, Bunnik, Netherlands

[73] Assignee: Stamicarbon B.V., Geleen, Netherlands

[21] Appl. No.: 744,829

[22] Filed: Nov. 24, 1976

Related U.S. Application Data

[63] Continuation-in-part of Ser. No. 709,533, July 28, 1976.

[30] Foreign Application Priority Data

Nov. 29, 1975 Netherlands ........................ 7513958

[51] Int. Cl.² .............................................. C08J 9/10
[52] U.S. Cl. ......................... 260/2.5 HA; 260/2.5 R; 260/2.5 P; 260/2.5 E; 260/28.5 D; 260/876 R; 260/876 B; 260/897 C
[58] Field of Search ........... 260/2.5 HA, 2.5 P, 2.5 E, 260/897 C, 2.5 R

[56] References Cited

U.S. PATENT DOCUMENTS

| | | | |
|---|---|---|---|
| 3,211,677 | 10/1965 | Field et al. | 260/2.5 P |
| 3,442,837 | 5/1969 | Broty et al. | 260/897 C |

FOREIGN PATENT DOCUMENTS

| | | | |
|---|---|---|---|
| 1,269,957 | 4/1972 | United Kingdom | 260/2.5 HA |
| 1,406,230 | 9/1975 | United Kingdom | 260/2.5 HA |

*Primary Examiner*—Morton Foelak
*Attorney, Agent, or Firm*—Cushman, Darby & Cushman

[57] ABSTRACT

Improved foamable polymer compositions of polyvinyl chloride and copolymers containing vinyl chloride, with little or no plasticizer, are described. The foamable polymer compositions contain polyvinyl chloride or a copolymer containing vinyl chloride, a blowing agent, and a high density, high molecular weight polyethylene. The compositions may also contain stabilizers, lubricants, activators, and inorganic fillers or pigments. Rigid low density foam products are made from these compositions.

9 Claims, 1 Drawing Figure

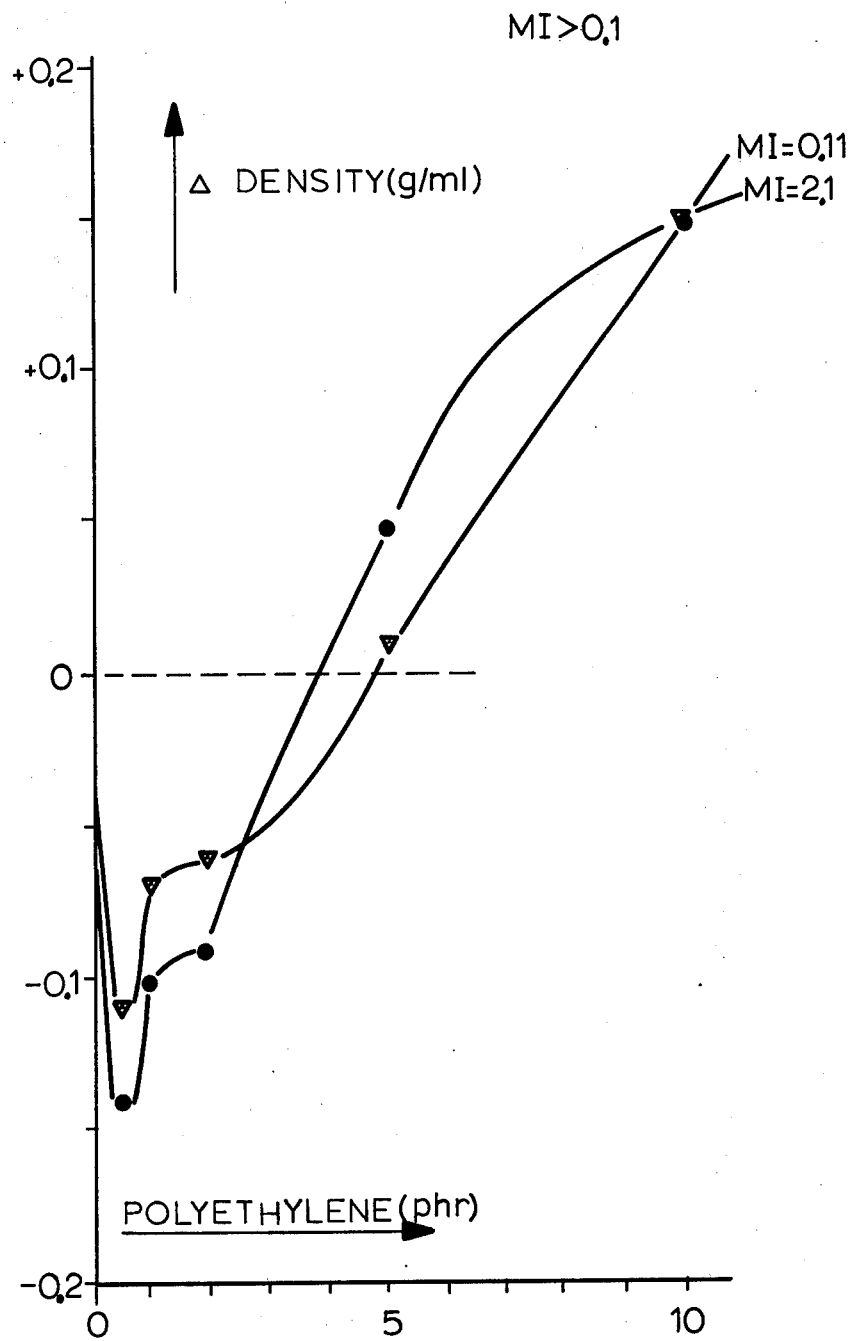

FOAMABLE VINYL-CHLORIDE POLYMERS AND RIGID FOAM STRUCTURES MADE THEREOF

BACKGROUND OF THE INVENTION

This is a continuation-in-part of U.S. patent application Ser. No. 709,533 filed July 28, 1976, the entire specification (including claims) of which is hereby incorporated by reference.

Foamable polyvinyl chloride compositions containing little or no plasticizer are known. See, for example, published British Pat. Specification No. 1,321,706, which is hereby incorporated by reference. These compositions, with at most only minor amounts of a plasticizer component, are particularly suitable for the manufacture of extruded rigid foam articles such as tubes and other shaped members. As those in the art are aware, these foamable polymer compositions contain polyvinyl chloride, or copolymers containing vinyl chloride, a chemical or physical blowing agent, and one or more additives, such as stabilizers, auxiliary stabilizers, substances to improve impact strength, lubricants, etc.

The foamable polyvinyl chloride compositions are extruded into shaped articles such as tubes, etc. The rigid foam tubes, and other rigid foam-shaped articles, have many uses.

An important physical characteristic of these rigid foam articles is their density. It is often desirable to obtain rigid foam articles with as low a density as possible. One way of producing a low density polyvinyl chloride foam is to add large amounts of a chemical or a physical blowing agent to the foamable polyvinyl chloride composition. However, such compositions are difficult to use in the production of foamed extruded articles such as tubes and sheet members. If the amount of foaming agent is too large the foaming proceeds too vigorously, so that an irregular foam with uneven cells and an uneven surface is formed. In addition, the density of the foamed product is difficult to control and may be higher than is desired. Finally, low density extruded hard foam articles made by this method exhibit poor dimensional stability at elevated temperatures so that such extruded articles are not suitable for applications requiring constant dimensions.

Another method of producing a polyvinyl chloride foam is by adding certain modifiers, e.g. copolymers of butadiene, styrene, and/or α-methylstyrene. Acrylonitrile, polyacrylates, polymethacrylates, ABS (acrylonitrile-butadiene-styrene), MBS (methyl methacrylate-butadiene-styrene) and MABS (methyl methacrylate-acrylonitrile-butadiene-styrene) are also added to polyvinyl chloride foams to promote a foam having regular cells and an even surface. However, relatively large quantities of these modifiers must be added, and this is expensive. In this regard it is noted that these modifiers are themselves considerably more expensive than polyvinyl chloride.

SUMMARY OF THE INVENTION

The present invention provides foamable polyvinyl chloride compositions from which improved low density, rigid, extruded foamed articles may be made.

It is an object of the present invention to produce vinyl chloride polymer compositions that can be processed into foams having a regular cell structure.

Another object of the present invention is to produce vinyl chloride polymer compositions that can be processed into foams having a comparatively low density.

Another object of the present invention is to produce foamable vinyl chloride polymer compositions that can be processed into foamed articles whose dimensional stability at elevated temperatures is such that articles of accurate dimension can be made.

Another object of the present invention is to produce foamable vinyl chloride polymer compositions that can be processed into extruded foamed articles, particularly tubes and profiles and other shaped members, having a smooth surface appearance.

Surprisingly, it has been found that the incorporation of comparatively minute amounts of a high density, high molecular weight polyethylene in a foamable vinyl chloride polymer composition makes it possible to produce vinyl chloride polymer compositions which satisfy the objects of the present invention.

BRIEF DESCRIPTION OF THE DRAWING

The FIGURE shows the density of foamed polyvinyl chloride compositions containing from 0.5 to 10 parts by weight of a high density, high molecular weight polyethylene having a melt index (MI) of 0.11 decigram per minute (dg/min), per 100 parts of polyvinyl chloride, compared to the density of foamed polyvinyl chloride without polyethylene. That is, in each case the density of a foamed polyvinyl chloride composition containing from 0.5 to 10 parts by weight of a high density, high molecular weight polyethylene having a melt index of 0.11 dg/min per 100 parts of polyvinyl chloride was determined, and the density of the same foamed polyvinyl chloride without polyethylene was determined. The density of the pure foamed polyvinyl chloride was subtracted from the density of the foamed polyvinyl chloride composition containing polyethylene. It will be noted that in each case where no more than 4 parts of high density, high molecular weight polyethylene per 100 parts by weight of polyvinyl chloride are contained in the composition that the density is less than polyvinyl chloride alone. The lowest density was obtained using about 0.5 parts of high density, high molecular weight polyethylene per 100 parts by weight of polyvinyl chloride.

The FIGURE also shows the densities of foamed polyvinyl chloride compositions containing a high density, high molecular weight polyethylene having a melt index of 2.1 dg/min, again compared to the density of the foamed polyvinyl chloride composition without polyethylene. Again, the density of the foamed polyvinyl chloride composition containing no more than 4 parts by weight of high density, high molecular weight polyethylene per 100 parts by weight of polyvinyl chloride was found to be lower than the density of the pure foamed polyvinyl chloride. The lowest densities were again obtained at a content of about 0.5 parts of high density, high molecular weight polyethylene per 100 parts of polyvinyl chloride.

DETAILED DESCRIPTION OF THE INVENTION

It has been found in accordance with the present invention that foamable polymer compositions containing polyvinyl chloride, or copolymers of vinyl chloride and another monomer, with little or no plasticizer, and having a uniform cellular structure, of comparatively low density, and producing extruded articles having a smooth surface appearance, and exhibiting a good dimensional stability at elevated temperatures, can be obtained by using a composition which contains a high density, high molecular weight polyethylene in addition to the normal additives and usual foaming agent. The high molecular weight polyethylene which is incorporated in the compositions according to the present invention has a melt index (measured according to the ASTM D 1238 condition E) which is more than 0.10 dg/min but less than 2.1 dg/min. The "melt index" is defined as the mass rate of flow of polyethylene through a specified capillary under controlled conditions of temperature and pressure. See F. Billmeyer, *Textbook of Polymer Science, 2nd Ed.*, page 188 (John Wiley 1971). In accordance with the present invention, it has been found that the incorporation of a comparatively minute quantity of such a high density, high molecular weight polyethylene in a vinyl chloride polymer composition makes it possible to obtain vinyl chloride polymer compositions that can be processed into foams having a regular cellular structure, a comparatively low density, and producing rigid foamed extruded articles having good dimensional stability at elevated temperatures and having a smooth surface appearance. The high density, high molecular weight polyethylene is incorporated in amounts up to about four parts by weight per 100 parts by weight of vinyl chloride polymer.

The foamable vinyl chloride polymer compositions of the present invention contain both additives and a foaming agent. The compositions of the present invention may be either homopolymers of vinyl chloride or copolymers of vinyl chloride with up to 30% by weight of one or more comonomers.

Monomers which may be copolymerized with vinyl chloride in accordance with the present invention are, for example, vinylidene chloride, vinyl esters such as vinyl acetate, vinyl butyrate and vinyl benzoate, acrylic acid and α-alkyl acrylic acids, alkyl esters, amides, or nitriles thereof. Examples of suitable acrylic acid derivatives include ethacrylic acid, ethyl acrylate, methyl methacrylate, butyl ethacrylate, acryl amide and acrylonitrile. Other suitable monomers includes vinyl aromatic compounds such as styrene, chlorostyrene, methyl styrene, ethyl styrene, vinyl naphthalene, alkyl esters of maleic acid and fumaric acid, such as diethyl maleate, vinyl alkyl esters and vinyl alkyl ketones, vinyl pyridines, and copolymerizable olefins, such as ethylene, propylene, isobutylene, and 4-methyl pentene-1. Mixtures of polyvinyl chloride with copolymers of vinyl chloride may also be used. The term copolymers also comprises graft and block copolymers, such as e.g., graft copolymers of vinyl chloride on ethylene/vinyl acetate copolymers.

When copolymers of vinyl chloride and one or more other monomers are used, in the practice of the present invention, it is preferred that the copolymers contain at least 70% by weight of vinyl chloride and not more than 30% by weight of other monomers. It is particularly preferred, in the practice of the present invention, that copolymers contain at least about 90% by weight of vinyl chloride, and no more than about 10% by weight of other monomers. Comonomers which are particularly preferred in the practice of the present invention include vinylidene chloride, vinyl esters, acryl esters, olefins such as ethylene, propylene, isobutylene, and other comonomers commonly used in vinyl chloride polymerization processes.

The vinyl chloride polymers to be used according to the present invention may also have been mixed with postchlorinated vinyl chloride polymers. The various constituents of the vinyl chloride polymer or copolymer may be mixed in any physical form in which these constituents may be available. It is preferred, however, that these various constituents be mixed in the form of powders. It is especially preferred that these powdered constituents be granulated prior to mixing.

The vinyl chloride polymers used in the present invention contain at most about five parts by weight of a plasticizer or solvent per 100 parts of vinyl chloride. The vinyl chloride polymers used in the present invention preferably have a Fikentscher K-value as defined in *Cellulose Chemie*, Vol. 13, page 58 (1932) that ranges between about 45 and about 85, and more particularly ranges between about 50 and about 75.

The vinyl chloride polymer used may have been prepared by any process which is well known in the art. For example, suspension polymerization, emulsion polymerization, bulk polymerization, and solution polymerization are all suitable.

The density of the vinyl chloride polymer foam is determined in part by the nature and amount of the blowing agent which is incorporated in the composition. The use of a chemical blowing agent in amounts from about 0.2 to about 2 parts by weight per 100 parts by weight of vinyl chloride polymer produces foams having densities from about 0.4 to about 1 g/cm$^3$. The blowing agent is used in amounts from about 0.1 to 2 parts by weight per 100 parts by weight of vinyl chloride polymer. Preferably, the blowing agent is used in amounts from about 0.2 to 1.5 parts by weight per 100 parts by weight of vinyl chloride polymer. A wide variety of chemical blowing agents may be incorporated in the composition according to the invention. Suitable chemical blowing agents are agents which release nitrogen, for example, azobisisobutyronitrile, diazoaminobenzene, p,p'-oxybis-(benzene sulphonyl hydrazyde), N,N'-dinitroso pentamethylene tetramine, p,p'-azobis (benzene sulphonyl semicarbon amide), diethyl azoisobutyrate, 1,3-bis (xenyl) -triazine, and 4,4'-oxybix (benzene sulphonyl hydrazyde). In general, these blowing agents are azo, nitroso, or sulphonylhydrazine compounds.

The density of the foamed product produced by a foamable polyvinyl chloride composition is determined in part by the amount of blowing agent. It is generally desirable to obtain the lowest possible density. However, it is also desirable to obtain a foam structure which is as uniform as possible. The requirement of uniformity sets limits on the amount of foaming or blowing agent which may be used. Although comparatively large amounts of foaming agent make it possible to obtain foams with a low density, the use of such large amounts of foaming agent may result in foaming which proceeds too vigorously. The products of too vigorous foaming exhibit uneven cell structure and an uneven surface appearance. For this reason, it is most preferable to limit the amount of foaming agent (blowing agent) to no more than about 1 part by weight blowing agent per 100 parts by weight of vinyl chloride polymer. The maximum amount of blowing agent which may be incorporated in the composition is a function of the particular blowing agent used, the volume of gas which a given particular blowing agent will produce, the rate at which the gas is produced, etc. The optimum amount of any particular blowing agent which may be used can be readily determined by those of ordinary skill in the art.

Activators which lower the temperature at which the blowing agent releases gas may be used. These activators are generally lead, barium, cadmium, or zinc salts, or the like.

Lubricants and mixtures of lubricants and other conventional additives may be incorporated in the compositions according to the present invention. Lubricants and mixtures of lubricants are incorporated in the compositions according to the present invention in amounts from about 0.5 to about 5 parts by weight per 100 parts by weight of vinyl chloride polymer. Preferably, lubricants and mixtures of lubricants are incorporated in amounts from about 1 to about 4 parts by weight per 100 parts by weight of vinyl chloride polymer. Suitable lubricants, or mixtures of lubricants, are for example, paraffin, polyethylene waxes, calcium stearate, ethylene bis-stearyl amide, and other lubricants which are well-known to those in the art.

Finely divided inorganic fillers and/or pigments may also be incorporated in the compositions of the present invention in amounts from about 1 to about 15 parts by weight per 100 parts by weight of vinyl chloride polymer. Examples of such fillers and pigments which may be incorporated in the compositions according to the present invention are titanium dioxide, iron oxide, calcium carbonate, and silicon dioxide.

Stabilizers and other additives may be used in the compositions according to the present invention. For example, stabilizers composed of lead compounds, barium-cadmium compounds, or tin compounds may be incorporated in the compositions according to the present invention in amounts from about 0.5 to about 4 parts by weight per 100 parts by weight of vinyl chloride polymer. As those in the art are aware, the oxides, hydroxides, and fatty acid salts of these metals are generally most effective. These stabilizers are added to improve the heat and light stability of the vinyl chloride polymer.

If desired, the properties of the foamable vinyl chloride polymers of the present invention can be further improved by incorporating one or more of the conventional modifiers, such as chlorinated ethylene, ABS, MBS, MABS, or polymethyl methacrylate, all well known to those in the art.

The foamable vinyl chloride polymers of the present invention are used to produce hard or rigid foam structures, particularly rigid foam extruded structures, such as profiles. Therefore, in accordance with the present invention, no plasticizers or solvents are generally used. It is, however, within the scope of the present invention to use very small amounts of a plasticizer. No more than about 5 parts by weight of plasticizer per 100 parts by weight of vinyl chloride composition are used.

The present invention will be further elucidated by the following two Examples, but the invention is not limited to these Examples. It is understood that various other modifications will be apparent to and can readily be made by those skilled in the art without departing from the scope and spirit of this invention. Accordingly, it is not intended that the scope of the claims appended hereto be limited to the description set forth herein, but rather that the claims be construed as encompassing all of the features of the present invention, including all features which would be treated as equivalents thereof by those skilled in the art to which this invention pertains.

EXAMPLE 1

A foamable polyvinyl chloride composition was prepared, hereafter called the parent composition, to which was added varying amounts of a high molecular weight polyethylene. Rigid foam extruded structures were made from each of the compositions, both those which contained high density, high molecular weight polyethylene and the parent composition which did not contain high density, high molecular weight polyethylene. The density of each of these rigid foam structures was determined and compared as a function of the amount of high density, high molecular weight polyethylene incorporated. Each composition tested was identical expept for the amount of high density, high molecular weight polyethylene incorproated therein.

The polyvinyl chloride parent composition consisted of polyvinyl chloride with a Fikentscher K-value of 59, and per 100 parts by weight of polyvinyl chloride, the following ingredients:
  3.5 parts by weight of a barium-cadmium-lead stabilizer;
  1.2 parts by weight of a combination lubricant, consisting of a technicalgrade mixture of higher fatty acids, higher fatty acid metal salts, and esters of higher alcohols with the higher fatty acids;
  0.5 parts by weight of azodicarbon amide;
  5 parts by weight of fine calcium carbonate; and
  2 parts by weight of titanium dioxide.

Into this parent composition, varying amounts of a high density, high molecular weight polyethylene were incorporated. In particular, five compositions were prepared: The first contained 0.5 parts of high density, high molecular weight polyethylene per 100 parts by weight of polyvinyl chloride; the second contained 1 part by weight of a high density, high molecular weight polyethylene per 100 parts by weight of polyvinyl chloride; the third contained 2 parts by weight of high density, high molecular weight polyethylene per 100 parts by weight of polyvinyl chloride; the fourth contained 5 parts by weight of high density, high molecular weight polyethylene per 100 parts by weight of polyvinyl chloride; and the fifth contained 10 parts by weight of high density, high molecular weight polyethylene per 100 parts by weight of polyvinyl chloride. A commercially available high density, high molecular weight polyethylene (commercialized by Naamloze Vennootschap DSM under the registered trademark Stamylan 9800) was used, which had a melt index according to ASTM D-1238 of 0.11 dg/min. The compositions produced by incorporating this high density, high molecular weight polyethylene into the parent polyvinyl chloride compositions were polymerized, foamed and extruded. The foams so produced were found to exhibit uniform cellular structure and exhibit a smooth surface appearance.

The FIGURE shows the density of these foamed polyvinyl chloride compositions containing from about 0.5 to 10 parts by weight of a high density, high molecular weight polyethylene having a melt index of 0.11 dg/min per 100 parts of polyvinyl chloride, compared to the density of the parent foamed polyvinyl chloride.

EXAMPLE 2

The parent polyvinyl chloride composition described in Example 1 was used to prepare another series of five compositions respectively incorporating 0.5, 1, 2, 5, and 10 parts by weight of a high density, high molecular weight polyethylene (Stamylan 6409, a high density polyethylene made an sold by Naamloze Vennootschap DSM) having a melt index of 2.1 dg/min. The five compositions incorporating polyethylene thus produced, and the parent composition, were polymerized, foamed and extruded. The density of each extruded product was determined. The FIGURE also compares the density of each composition containing high density, high molecular weight polyethylene with the density of the parent composition. Each of the foamed extruded products exhibited both uniform cell structure and a smooth surface appearance.

What is claimed is:

1. A foamable vinyl chloride polymer composition, comprising:
    polyvinyl chloride or a vinyl chloride copolymer containing at least 70% by weight of vinyl chloride;
    from 0.1 to 2% by weight of a chemical blowing agent;
    from 1 to 5% by weight of a plasticizer, and from 0.5 to 4% by weight of a high density, high molecular weight polyethylene having a melt index more than 0.1 and less than 2.1 dg/min as defined in ASTM D-1238, all percentages being calculated on the quantity of vinyl chloride polymer.

2. The foamable vinyl chloride polymer composition of claim 1 wherein said high density, high molecular weight polyethylene is present in an amount from 0.5 to 2% by weight.

3. The foamable vinyl chloride polymer composition of claim 1 wherein said high density, high molecular weight polyethylene is present in an amount of 0.5% by weight.

4. A process of preparing a rigid polyvinyl chloride product, comprising:
    mixing a foamable vinyl chloride polymer composition as defined in claim 1,
    polymerizing said composition,
    foaming said composition, and forming said composition into a rigid foam product.

5. A process of preparing a rigid polyvinyl chloride foam product as set forth in claim 4 wherein said rigid polyvinyl chloride foam product is formed by extrusion.

6. A rigid polyvinyl chloride foam product prepared by the process of claim 4.

7. A rigid polyvinyl chloride foam product prepared by the process of claim 5.

8. The foamable vinyl chloride polymer composition of claim 1 wherein said chemical blowing agent is present in an amount from 0.1 to 1% by weight.

9. The foamable vinyl chloride polymer composition of claim 1 wherein said high density, high molecular weight polyethylene has a melt index of at least 1.0 but not more than 2.1 dg/min.

* * * * *

UNITED STATES PATENT OFFICE
CERTIFICATE OF CORRECTION

Patent No. 4,039,486              Dated August 2, 1977

Inventor(s) Johannes M.A.A. Van der Mark

It is certified that error appears in the above-identified patent and that said Letters Patent are hereby corrected as shown below:

Col. 7, line 17, "from 1 to 5% by weight" should read "from 0 to 5% by weight".

Col. 4, line 40, "oxybix" should read "oxybis".

Signed and Sealed this

Third Day of January 1978

[SEAL]

Attest:

RUTH C. MASON  
Attesting Officer

LUTRELLE F. PARKER  
Acting Commissioner of Patents and Trademarks